United States Patent [19]
Larson

[11] Patent Number: 5,007,378
[45] Date of Patent: Apr. 16, 1991

[54] MILKING MACHINE TEAT CUP ASSEMBLY
[75] Inventor: Reed A. Larson, Watertown, Wis.
[73] Assignee: Hi-Life Rubber Inc., Johnson Creek, Wis.
[21] Appl. No.: 325,218
[22] Filed: Mar. 17, 1989
[51] Int. Cl.5 .................................................. A01J 5/04
[52] U.S. Cl. .................................. 119/14.47; 119/14.49
[58] Field of Search ................. 119/14.49, 14.47, 14.5, 119/14.51, 14.52, 14.53

[56] References Cited

U.S. PATENT DOCUMENTS

| | | | |
|---|---|---|---|
| 2,408,390 | 10/1946 | Gessler | 119/14.49 |
| 2,687,112 | 8/1954 | Shurts | 119/14.49 |
| 3,696,790 | 10/1972 | Albright | 119/14.47 |
| 4,141,319 | 2/1979 | Maier et al. | 119/14.49 X |
| 4,372,250 | 2/1983 | Larson | 119/14.49 X |
| 4,530,307 | 7/1985 | Thompson | 119/14.49 |
| 4,604,969 | 8/1986 | Larson | 119/14.49 X |
| 4,610,220 | 9/1986 | Goldberg et al. | 119/14.5 X |
| 4,651,676 | 3/1987 | Kupres | 119/14.47 |

FOREIGN PATENT DOCUMENTS

| | | | |
|---|---|---|---|
| 10461 | 12/1932 | Australia | 119/14.53 |
| 0354982 | 7/1961 | Switzerland | 119/14.49 |
| 1032314 | 6/1966 | United Kingdom | 119/14.49 |

Primary Examiner—Robert P. Swiatek
Assistant Examiner—Todd E. Manahan
Attorney, Agent, or Firm—Michael, Best & Friedrich

[57] ABSTRACT

The teat cup assembly includes a shell and a flexible liner, which can be made from silicone rubber, having a suction portion which fits inside the shell and a head portion having a peripheral, downwardly extending cuff which fits over the upper end of the shell. The liner cuff is clamped into sealing engagement with the shell by an annular sleeve slidably mounted on the shell for relative axial movement between a locked position and an unlocked position axially displaced from the cuff so that the liner can be installed into and removed from the shell. The sleeve includes a protective collar which overlies at least the lower portion of the cuff when the sleeve is in the locked position. The sleeve cooperates with one or more interlocking, circumferentially-extending grooves and projections on the outer surface of the shell and the inner surface of the cuff to hold the liner in place on the shell. The sleeve is releasably held in the locked position by an interlocking, circumferentially-extending projection and groove on the outer surface of the cuff and the inner surface of the sleeve.

18 Claims, 1 Drawing Sheet

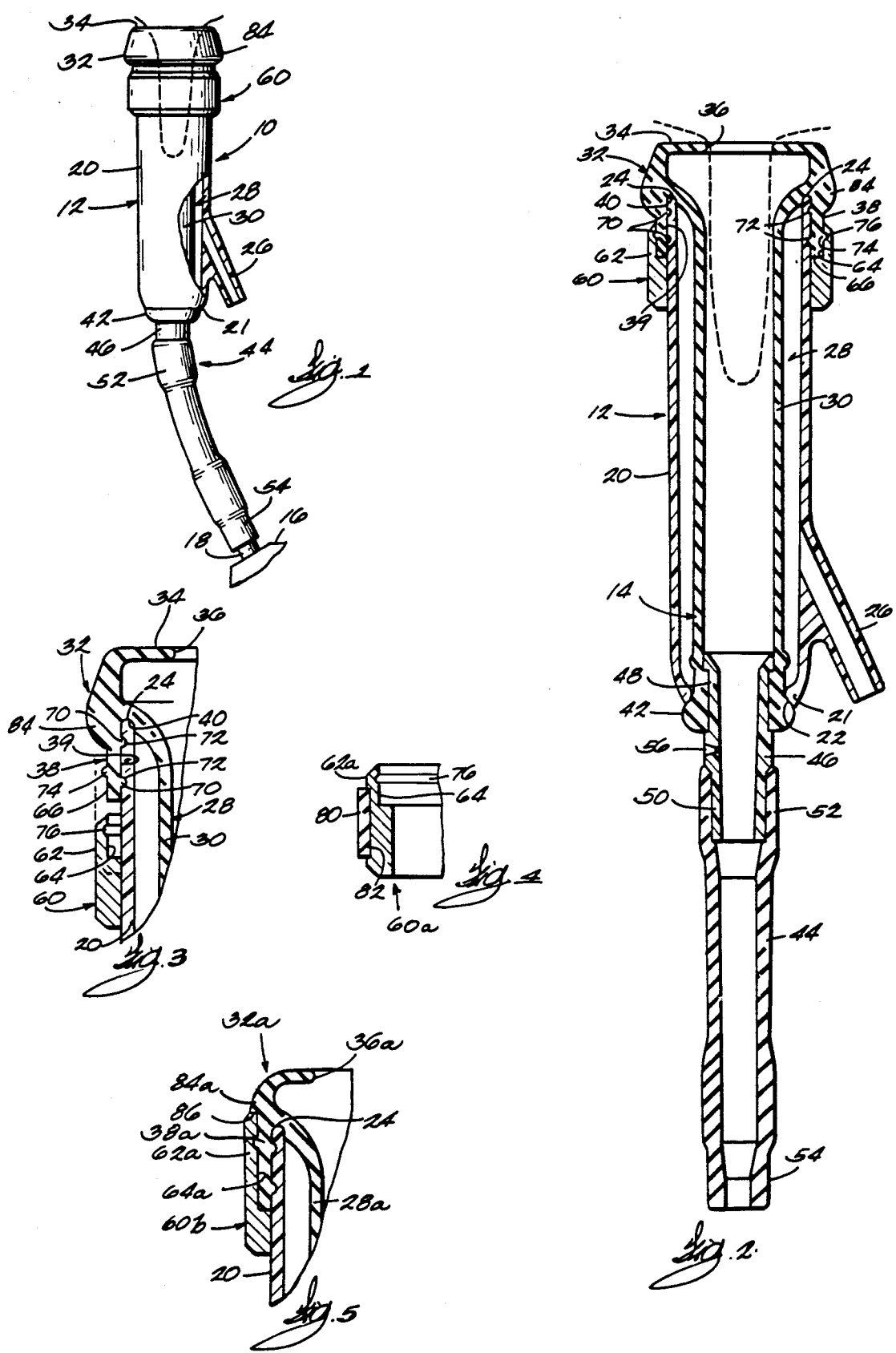

MILKING MACHINE TEAT CUP ASSEMBLY

BACKGROUND OF THE INVENTION

This invention relates to teat cup assemblies for vacuum-operated milking machines including a rigid shell and a flexible inflation.

Automatic milking machines employ teat cup assemblies having a hollow, rigid outer shell and a resilient inflation including a tubular liner portion installed in the shell in a manner to form a seal at both ends of the shell and define a chamber between a shell and the liner portion. The cow's teat is inserted into the upper end of the liner portion and a milking tube portion on the lower end is connected to a so-called claw of the milking machine. During the milking operation, a vacuum maintained in the milking machine causes milk to flow from the teat and through the inflation.

One type of conventional liner has a head including a laterally extending wall having a central opening which receives a cow's teat and a downwardly extending skirt or cuff which fits snugly over the upper end of the shell. After the teat cup assembly has been removed from a cow's teat, it is suspended from a claw nipple in a manner to shut off flow. During repeated milking operations, the head of the liner can be subjected to a number of potentially damaging impacts, e.g., dropping on a concrete floor or drain grating of a milking stall, banging into a milking stall wall, another teat cup assembly or other equipment, or being stepped on by a cow.

Liners most often are made from a natural or synthetic rubber composition which is resistant to tearing or cutting from such impacts. Silicone rubbers are substantially less vulnerable to attack by butterfats, teat treatment preparations and other chemicals than conventional rubber compositions used for liners. Also, silicone rubbers also have other characteristics which normally would prolong the useful life of milking machine liners. However, the tear and puncture resistance of silicone rubbers is substantially lower than for more conventional rubber compositions and liners made from a silicone rubber tend to tear and/or puncture when subjected to common occuring impacts like those mentioned above.

U.S. Pat. No. 4,651,676 discloses a teat cup assembly including a shell which is designed to protect the liner cuff against impacts. The shell includes an integral, annular flange defining an annular recess which receives and covers the cuff. Such an arrangement requires a relatively complicated mold for fabrication of the shell. The assembly relies on a wedge fit between the liner cuff and the annular flange to prevent twisting or other movement of the liner relative to the shell and also to prevent entry of water and other foreign materials into the shell, particularly during washing. The tightness of this fit can vary considerably, depending on the buildup of manufacturing tolerances.

U.S. Pat. No. 4,651,676 also discloses that the liner can be secured to the shell by applying an adhesive in the annular recess, in which case a liner could not be conveniently replaced and the entire assembly must be discarded when the liner wears out.

SUMMARY OF THE INVENTION

One of the objects of the invention is to provide a milking machine teat cup assembly which is arranged to accommodate inflations made from a wide variety of elastomeric materials, including silicone rubbers.

Another object of the invention is to provide such a teat cup assembly which is arranged so that the inflation can be conveniently replaced.

A further object of the invention is to provide such a teat cup assembly including a shell, a liner having a cuff which fits over one end of the shell and means for protecting the liner cuff against damage from impacts.

A still further object of the invention is to provide a teat cup described in the immediately preceding paragraph including means for positively, and yet releasably, clamping the liner cuff into sealing engagement with the shell.

A yet still further object of the invention is to provide a teat cup assembly described in the immediately preceding paragraph including means for positively restraining movement of the liner relative to the shell after installation.

Other objects, aspects and advantages of the invention will become apparent to those skilled in the art upon reviewing the following detailed description, the drawing and the appended claims.

The teat cup assembly provided by the invention includes a shell having a tubular body, a flexible liner having a suction portion which fits inside the shell and a head portion including an opening for receiving a cow's teat and a peripheral cuff which surrounds the upper portion of the shell and is spaced radially outwardly therefrom to define an annular recess which receives the upper end of the shell and sealingly engages the shell rim, and an annular sleeve surrounding the body of the shell and mounted on the shell for relative axial movement between an unlocked position wherein the sleeve is axially displaced from the liner cuff and a locked position wherein at least a portion of the sleeve overlies at least the lower portion of the cuff to clamp the cuff into sealing engagement with the upper end portion of the shell body. The liner can be made from a silicone rubber and the sleeve protects the cuff against damage from impacts.

In a preferred embodiment, the outer surface of the shell includes one or more circumferentially-extending grooves, each of which receives a complementary, circumferentially-extending projection on the inner surface of the cuff. When the sleeve is in the locked position, the interlocking groove(s) and projection(s) serve to restrain movement of the liner in an axially outwardly direction relative to the shell rim.

In a preferred embodiment, the inner surface of the sleeve includes a circumferentially-extending groove which snaps over a complementary, circumferentially-extending projection on the outer surface of the cuff to hold the sleeve in place when the sleeve is in the locked position.

The sleeve can include an external shock-absorbing bumper of resilient material to provide additional protection against impacts.

BRIEF DESCRIPTION OF THE DRAWINGS

FIG. 1 is a Partially sectioned, partially broken away view of a teat cup assembly of the invention, shown with the liner mouthpiece connected to a cow's teat and the milking tube section connected to a nipple of a milker claw.

FIG. 2 is an enlarged, cross-sectional view of the teat cup assembly illustrated in FIG. 1.

FIG. 3 is an enlarged, fragmentary, cross-sectional view of the upper end of the teat cup assembly illustrated in FIG. 1.

FIG. 4 is a fragmentary, cross-sectional view of an alternative arrangement for the locking sleeve.

FIG. 5 is a view similar to FIG. 3 illustrating an alternate arrangement for the head end of the liner.

DESCRIPTION OF THE PREFERRED EMBODIMENTS

Illustrated in FIG. 1 is a teat cup assembly 10 including a rigid, generally cylindrical outer shell 12 which supports a milking inflation 14 connected to a milker claw 16 (shown fragramentarily). The milker claw 16 is connected to a suitable vacuum system (not shown) in the usual manner and includes a plurality of outwardly projecting nipples 18 (one shown). The shell 12 has a tubular body 20, a lower end portion 21 including an opening 22 of reduced diameter and an upper end terminating in a rim 24.

Located in the side of the shell 12 is a nipple 26 connected, via suitable tubing (not shown), in communication with a pulsator which alternately opens to atmospheric pressure and then evacuates the chamber between the interior wall of the shell and a portion of the inflation inside the shell to alternately contract and expand same for milking.

In the specific construction illustrated in FIGS. 1–3, the inflation 14 is a three-piece unit and includes a liner 28 having an elongated, generally cylindrical suction sleeve or barrel section 30 which fits inside the shell 12 and a head portion or section 32 which has a mouthpiece 34 including a circular opening 36 for receiving a cow's teat. The head section 32 has a peripheral, downwardly extending skirt or cuff 38 which surrounds the upper end portion of the shell 12. The inner surface 39 of the cuff 38 is spaced radially outwardly from the outer wall of the liner suction section 30 to define an annular recess 40 which receives and sealingly engages the shell rim 24. The liner 28 also has a lower end 42 which fits into the opening 22 in the lower end of the shell 12.

The terms "inflation" and "liner" are used interchangeably in the trade. Some inflations or liners are one-piece units instead of being multiple-piece as in the construction illustrated in FIGS. 1–3. As used herein, the term "liner" means either the portion of one-piece units or the entire part for multiple-piece units which fits inside a shell and receives a cow's teat. "Inflation" means the entire unit illustrated in FIGS. 1–3 through which milk flows from a cow's teat to the milker claw 16, except for the shell 12.

The inflation also includes a separate milking tube section 44 and a sleeve connector 46 having an enlarged upper end portion 48 which fits inside the lower end 42 of the liner 28 and presses the outer wall thereof into sealing engagement with the shell opening 22. The connector 46 has a reduced lower end portion 50. The milking tube section 44 has an upper end 52 which fits over the lower end portion 50 of the connector 46 and a lower end 54 which slips onto a claw nipple 18.

In the specific embodiment illustrated, the connector 46 includes an air vent 56 through which a metered amount of air is admitted into the interior of the milking inflation 14 during the milking operation to permit faster flow of milk through the milking tube section 44 and into the claw 16.

The liner 28 and the milking tube section 44 can be made from any of a variety of conventional elastomeric materials. The liner 28 can be made from silicone rubber and the milking tube section 44 preferably is made from an elastomeric material which is more resistant to damage from impacts than silicone rubber, preferably a synthetic or natural rubber composition including curing agents and the like. The connector 46 can be made from a variety of conventional rigid materials, preferably a rigid synthetic thermoplastic or thermosetting material and most preferably a transparent material. The shell 12 can be made from a metal, such as stainless steel, or a synthetic thermoplastic or thermosetting material, including transparent or translucent materials so that the milking operation of the liner 28 can be observed.

During milking operations, the sides of the head section 32 of the liner 28 can be subjected to damaging impacts as mentioned above. In accordance with the invention, the liner cuff 38 is protected against potential damage from such impacts by an annular sleeve 60 which is mounted on the shell body 20 for slidable movement in an axial direction relative to shell 22 between an unlocked position illustrated by solid lines in FIG. 3 and the locked position illustrated by solid lines in FIG. 2 and by dashed lines in FIG. 3. The upper portion of the sleeve 60 has a protective collar 62 including an annular recess 64 which is dimensioned to receive a lower portion 66 of the liner cuff 38. When the sleeve 60 is in the unlocked position, it is axially displaced from the cuff so that the liner 28 can be conveniently installed into and removed from the shell 12.

After the liner 28 has been fitted into the shell 12, the sleeve 60 is pushed upwardly to a locked position wherein the collar 62 overlies the lower portion 66 of the cuff 38 and clamps it into sealing engagement with the shell body 20. The collar recess 64 and the cuff 38 are dimensioned so that, when the sleeve 60 is in the locked position, there is a compression seal between the outer surface of the cuff 38 and the inner surface of the collar 62. This seal prevents the entry of washing water and other foreign materials between a collar 62 and the cuff 38.

Locking means preferably is provided on the shell 12 and on the cuff 38 for restraining movement of the liner 28 in an axially outwardly direction relative to the rim 24 when the sleeve is in the locked position. While various suitable arrangements can be used, in the specific instruction illustrated, such locking means includes a pair of axially-spaced, circumferentially-extending projections 70 on the inner surface of the cuff 38 which fit into complementary, axially-spaced, circumferentially-extending grooves 72 in the outer surface of the shell 12. The clamping action provided by the sleeve 60 cooperates with the projections 70 and the grooves 72 to lock the head section 32 of the liner 28 into place against both axially outwardly movement and twisting relative to the shell 12.

A single projection 70 and a single groove 72 or more than two of each can be used if desired. Also, while less desirable, the projection(s) 70 can be on the shell 12 and the groove(s) 72 in the cuff 38.

Detent means preferably is provided on the sleeve 60 and on the cuff 38 for releasably holding the sleeve 60 in the locked position. While various suitable arrangements can be used, in the specific construction illustrated, such detent means includes a circumferentially-extending projection 74 on the outer surface of the cuff 38 and a complementary, circumferentially-extending groove 76 in the inner surface of the sleeve collar 62 which snaps over the projection 74 when the sleeve 60 is pushed up over the lower portion 66 of the cuff 38. The groove 76 unsnaps from the projection 74 when the sleeve 60 is pulled downwardly toward an unlocked position.

Two or more projections 74 and grooves 76 can be used if desired. Also, while less desirable, the projection(s) 74 can be on the sleeve collar 62 and the groove(s) 76 can be in the cuff 38.

The sleeve 60 can be made from a variety of suitable rigid materials capable of withstanding impacts, including a metal such as stainless steel or a synthetic thermoplastic or thermosetting material such as a glass-filled polyester. When the shell 12 was made from a relatively light plastic material, the material and dimensions of the sleeve 60 can be varied to provide the added weight needed to obtain total weight for the teat cup assembly desired for the best shut off and/or optinum milking characteristics. At the present, stainless steel is the preferred material for the sleeve when the shell is made from a light plastic material. When the shell 12 is made from a transparent or translucent material, the axial dimension of the sleeve 60 can be shortened and the outside diameter increased to maximize the visibility of the liner 28 inside the shell so that more of the milking function can be observed.

FIG. 4 illustrates an alternate embodiment of the sleeve arranged to provide further protection against impacts. In this embodiment, the sleeve 60a includes an external, circumferentially-extending, shock-absorbing bumper 80. The bumper 80 is made from a resilient material, preferably an elastomeric material such as a urethane rubber or a synthetic or natural rubber similar to that used for the milking tube section 44. The bumper 80 can be molded directly or bonded by a suitable adhesive onto the outer surface of the sleeve 60a. The bumper 80 preferably is retained in a circumferentially-extending recess 82 in the outer surface of the sleeve 60a.

In the embodiment illustrated in FIGS. 1-3, the head section 32 of the liner 28 extends some distance above the shell rim 24 and includes a radially outwardly extending, enlarged portion 84 located in the vicinity of the shell rim 24 and adjacently above the sleeve 60 when it is in the locked position. The additional material of the enlarged portion 84 provides protection against damage from impacts above the sleeve 60.

This liner arrangement also facilitates installation of the teat cup assembly in the wash cups of clean-in-parlor type washing equipment. The cooperative locking action of the sleeve 60, projections 70, grooves 72, projection 74 and groove 76 prevents the head section 32 of the liner 28 from being pulled off the top of the shell 12 by such a washing cup. Also, the extension of the head section 32 above the sleeve 60 facilitates the formation of a seal between the sleeve and the liner cuff for protection against the entry of wash water or other foreign materials between the liner 28 and the shell 12.

FIG. 5 illustrates an alternative embodiment for the head section of the liner and the sleeve. In this embodiment, the head section 32a of the liner 28a does not extend as far above the shell rim 24 as the embodiment illustrated in FIGS. 1-3 and a smaller enlarged portion 84a which includes an outwardly extending lip 86. The sleeve 60b is arranged so that, when it is in the locked position, the collar 62b extends above the shell rim 24, and covers most of the outer surface of the cuff 38a. The collar 62b preferably is arranged so that the upper edge engages the lip 86 on the liner cuff 38a to form a seal against the ingress of foreign materials. Otherwise, the construction of the sleeve 60b and the liner 28a can be substantially the same as that described above and illustrated in FIGS. 1-3.

From the foregoing description, one skilled in the art can easily ascertain the essential characteristics of the invention and, without departing from the spirit and scope thereof, make various changes and modifications to adapt it to various usages.

I claim:

1. A milking machine teat cup assembly comprising:
   a shell including a tubular body having an outer wall and an upper end portion terminating in a rim;
   a flexible liner including a suction portion which fits inside said shell and has an outer wall, and a head portion having an opening for receiving a cow's teat and a peripheral cuff which surrounds the upper end portion of said shell and is spaced outwardly from the outer wall of said suction section to define an annular recess which receives the upper end portion of said shell and sealingly engages said rim, said cuff including an outer surface having a lower portion;
   an annular sleeve surrounding said body of said shell and slidably mounted on said shell for relative axial movement between an unlocked position wherein said sleeve is axially displaced from said cuff and a locked position wherein at least a portion of said sleeve overlies at least the lower portion of said cuff to clamp said cuff into sealing engagement with the upper end portion of said shell and to protect said cuff against impacts; and
   detent means on said sleeve and said cuff for releasably holding said sleeve in the locked position against movement in an axial direction relative to said cuff.

2. A milking machine teat cup assembly according to claim 1 including locking means on said shell and on said cuff for restraining movement of said liner in an axially outwardly direction relative to the rim of said shell when said sleeve is in the locked position.

3. A milking machine teat cup assembly according to claim 2 wherein:
   said cuff has an inner surface located adjacent the outer wall of said body of said shell; and
   said locking means includes a circumferentially-extending projection on one of the inner surface of said cuff and the outer wall of said body of said shell and a circumferentially-extending groove which receives said projection in the other of the inner surface of said cuff and the outer wall of said body of said shell.

4. A milking machine teat cup assembly according to claim 3 wherein said projection is on the inner surface of said cuff and said groove is in the outer wall of said body of said shell.

5. A milking machine teat cup assembly according to claim 4 including a plurality of said projections and said grooves in axially spaced relationship.

6. A milking machine teat cup assembly according to claim 1 wherein:
   said sleeve has an inner surface located adjacent the outer surface of said cuff; and
   said detent means includes a circumferentially-extending projection on one of the inner surface of said sleeve and the outer surface of said cuff and a circumferentially-extending groove which receives said projection in the other of the inner surface of said sleeve and the outer surface of said cuff.

7. A milking machine teat cup assembly according to claim 6 wherein said projection is on the outer surface of said cuff and said groove is in the inner surface of said sleeve.

8. A teat cup assembly according to claim 1 wherein said liner is made from a silicone rubber.

9. A teat cup assembly according to claim 8 wherein the head portion of said liner includes a radially outwardly extending, enlarged portion above said cuff and adjacent said sleeve when said sleeve is in the locked position.

10. A teat cup assembly according to claim 1 wherein said sleeve has an outer surface and carries a circumferentially-extending, shock-absorbing bumper of a resilient material extending radially outwardly beyond said outer surface.

11. A milking machine teat cup assembly according to claim 1 wherein said sleeve covers the entire lower portion of said cuff and extends axially above the rim of said shell when in the locked position.

12. A milking machine teat cup assembly comprising:
a shell including a tubular body having an outer wall and an upper end portion terminating in a rim;
a flexible liner of silicone rubber including a suction portion which fits inside said shell and has an outer wall and a head portion having an opening for receiving a cow's teat and a peripheral cuff which surrounds the upper end portion of said shell and is spaced outwardly from the outer wall of said suction section to define an annular recess which receives the upper end portion of said shell and sealingly engages said rim, said cuff including an outer surface having a lower portion;
an annular sleeve surrounding said body of said shell and slidably mounted on said shell for relative axial movement between an unlocked position wherein said sleeve is axially displaced from said cuff and a locked position wherein at least a portion of said sleeve overlies at least the lower portion of said cuff to clamp said cuff into sealing engagement with the upper end portion of said shell and to protect said cuff against impacts;
locking means on said shell and on said cuff and cooperating with said sleeve to restrain movement of said liner in an axially outwardly direction relative to the rim of said shell when said sleeve is in the locked position; and
detent means on said sleeve and on said cuff for releasably holding said sleeve in the locked position against axial movement relative to said cuff.

13. A milking machine teat cup assembly according to claim 12 wherein said sleeve covers the entire lower portion of said cuff and extends axially above the rim of said shell when in locked position.

14. A milking machine teat cup assembly according to claim 12 wherein:
said cuff has an inner surface located adjacent the outer wall of said body of said shell;
and said locking means includes a circumferentially-extending projection on the inner surface of said cuff and a circumferentially-extending groove which receives said projection in the outer wall of said body of said shell.

15. A milking machine teat cup assembly according to claim 14 including a plurality of said projections and said recesses in axially spaced relationship.

16. A milking machine teat cup assembly according to claim 15 wherein:
said sleeve has an inner surface located adjacent the outer surface of said cuff; and
said detent means includes a circumferentially-extending projection on the outer surface of said cuff and a circumferentially-extending groove which receives said projection in the inner surface of said sleeve.

17. A milking machine teat cup assembly according to claim 12 wherein the head portion of said liner includes a radially outwardly extending, enlarged portion above said cuff and adjacent said sleeve when said sleeve is in the locked position.

18. A milking machine teat cup assembly according to claim 12 wherein said sleeve has an outer surface and carries a circumferentially-extending, shock-absorbing bumper of a resilient material extending radially outwardly beyond said outer surface.

* * * * *